(12) United States Patent
Yang et al.

(10) Patent No.: US 11,430,359 B2
(45) Date of Patent: Aug. 30, 2022

(54) IMAGE DISPLAY DEVICE

(71) Applicant: Primax Electronics Ltd., Taipei (TW)

(72) Inventors: Yu-Zeng Yang, Taipei (TW); Hui-Ling Lin, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 78 days.

(21) Appl. No.: 17/031,703

(22) Filed: Sep. 24, 2020

(65) Prior Publication Data
US 2022/0036782 A1     Feb. 3, 2022

(30) Foreign Application Priority Data
Jul. 30, 2020   (TW) ................................ 109125824

(51) Int. Cl.
| | |
|---|---|
| *G09G 3/02* | (2006.01) |
| *G02B 3/00* | (2006.01) |
| *G03B 25/02* | (2006.01) |
| *G03B 21/625* | (2014.01) |
| *G02B 3/08* | (2006.01) |

(Continued)

(52) U.S. Cl.
CPC .............. *G09G 3/02* (2013.01); *G02B 3/005* (2013.01); *G02B 3/0031* (2013.01); *G02B 3/0056* (2013.01); *G02B 3/08* (2013.01); *G02B 5/0278* (2013.01); *G03B 21/625* (2013.01); *G03B 25/02* (2013.01); *G06F 3/02* (2013.01);

(Continued)

(58) Field of Classification Search
CPC ...... G02B 3/0056; G02B 3/0031; G02B 3/08; G02B 5/0278; G02B 3/005; G02B 21/625; G09G 3/02; G09G 2320/0606; G09G 2354/00; G03B 25/02; G06F 3/02; G06F 3/041

USPC ........................................ 359/456
See application file for complete search history.

(56) References Cited

U.S. PATENT DOCUMENTS

| | | | | |
|---|---|---|---|---|
| 3,346,674 A | * | 10/1967 | Kidder ................. | G03B 21/625 |
| | | | | 359/453 |
| 3,740,119 A | * | 6/1973 | Sakurai .................... | G02B 3/08 |
| | | | | 353/30 |

(Continued)

FOREIGN PATENT DOCUMENTS

| | | | | |
|---|---|---|---|---|
| CN | 1335944 | * | 2/2002 | ............. G03B 21/10 |
| CN | 106033169 | * | 10/2016 | ............. G02B 27/01 |

(Continued)

*Primary Examiner* — Clayton E. LaBalle
*Assistant Examiner* — Kevin C Butler
(74) *Attorney, Agent, or Firm* — Kirton McConkie; Evan R. Witt

(57) ABSTRACT

An image display device a light source, an image display layer and a refractive structure layer. The light source emits a light beam. The image display layer is located over the light source. The image display layer includes plural pattern sections. The refractive structure layer has a reference plane. When the light beam is irradiated on the refractive structure layer and there is a first angle between the light beam and the reference plane, the light beam is guided to a first pattern section, so that a first image is displayed on the image display layer. When the light beam is irradiated on the refractive structure layer and there is a second angle between the light beam and the reference plane, the light beam is guided to a second pattern section, so that a second image is displayed on the image display layer.

11 Claims, 6 Drawing Sheets

(51) Int. Cl.
  *G02B 5/02*     (2006.01)
  *G06F 3/02*     (2006.01)
  *G06F 3/041*    (2006.01)
(52) U.S. Cl.
  CPC ..... *G06F 3/041* (2013.01); *G09G 2320/0606* (2013.01); *G09G 2354/00* (2013.01)

(56) References Cited

U.S. PATENT DOCUMENTS

| | | | | |
|---|---|---|---|---|
| 4,054,907 | A * | 10/1977 | Itoh | H04N 9/31 348/786 |
| 5,254,390 | A * | 10/1993 | Lu | B29D 11/00278 428/209 |
| 5,563,738 | A * | 10/1996 | Vance | G03B 21/625 359/452 |
| 5,781,344 | A * | 7/1998 | Vance | G02B 5/0278 359/452 |
| 5,880,887 | A * | 3/1999 | Goto | G03B 21/625 359/457 |
| 6,771,419 | B1 * | 8/2004 | Yamagishi | H04N 9/31 359/453 |
| 11,085,607 | B2 * | 8/2021 | Chien | F21V 5/00 |
| 11,085,609 | B1 * | 8/2021 | Cheng | G02B 3/0056 |
| 2008/0225207 | A1 * | 9/2008 | Kim | G02B 5/0242 349/95 |
| 2010/0097408 | A1 * | 4/2010 | Michael Marcellinus | H04N 9/73 345/83 |
| 2012/0206923 | A1 * | 8/2012 | Tanaka | G02B 5/0231 264/2.7 |
| 2013/0094789 | A1 * | 4/2013 | Hoffman | G02B 3/005 383/106 |
| 2013/0100680 | A1 * | 4/2013 | Jin | G02B 6/0065 362/355 |
| 2014/0192540 | A1 * | 7/2014 | Eom | F21V 5/008 362/355 |
| 2015/0211708 | A1 * | 7/2015 | Stavely | G02B 3/0056 362/231 |
| 2016/0097499 | A1 * | 4/2016 | Chien | F21V 29/00 362/644 |
| 2018/0128448 | A1 * | 5/2018 | Chien | F21S 10/063 |
| 2018/0224581 | A1 * | 8/2018 | Takayama | G02B 6/0065 |
| 2019/0204647 | A1 * | 7/2019 | Toriyama | H04N 9/3197 |
| 2019/0243149 | A1 * | 8/2019 | Iguchi | G02B 30/26 |
| 2020/0363681 | A1 * | 11/2020 | Whitehead | G02F 1/133528 |
| 2021/0271058 | A1 * | 9/2021 | Markovic | G02B 13/0085 |
| 2021/0364880 | A1 * | 11/2021 | Tan | G02F 1/292 |
| 2021/0384461 | A1 * | 12/2021 | Kim | H01L 51/5253 |
| 2022/0036782 | A1 * | 2/2022 | Yang | G03B 21/625 |

FOREIGN PATENT DOCUMENTS

| | | | | |
|---|---|---|---|---|
| CN | 109154766 | * | 1/2019 | ............ G03B 21/00 |
| CN | I734573 | * | 7/2021 | ............ G02B 3/02 |
| EP | 1154316 | * | 10/2000 | ............ G03B 21/00 |

* cited by examiner

IMAGE DISPLAY DEVICE

FIELD OF THE INVENTION

The present invention relates to an image display device, and more particularly to an image display device for an electronic device.

BACKGROUND OF THE INVENTION

With the rapid development of science and technology, a variety of electronic devices are designed in views of convenience. For example, notebook computers, desktop computers, tablet computers, smart phones, mouse devices and keyboard devices are dispensable electronic devices that are used by the users every day. For helping the user well operate the electronic devices, the electronic devices are gradually developed in views of humanization.

Generally, according to the design of the manufacturers of electronic devices, the exclusive trademark images or decorative images are formed on the electronic devices in order to increase brand recognition and further beautify the appearance of the electronic devices. Nowadays, images are usually formed on most electronic devices by a printing process, a hot-pressing process or a sticker attaching process. After the image is completed, the image is fixed. That is, the appearance and shape of the image cannot be changed. For displaying different images on the same position of the electronic device, it is necessary to use liquid crystal screens, organic light-emitting diodes, electronic papers or other display technologies. However, the uses of these display technologies to achieve the purpose of displaying different images may inevitably increase the fabricating cost and increase the designing complexity. In addition to the above-mentioned display technologies, some manufacturers use image-variable grating structures to display different images. However, the applications of the image-variable grating structures are limited. For example, the change of the image is observed at different viewing angles. That is, it is impossible for the user to observe different images at the same viewing angle.

Therefore, it is important to provide an improved image display device in order to overcome the drawbacks of the conventional technologies.

SUMMARY OF THE INVENTION

An object of the present invention provides an image display device. The image display device includes a light source, an image display layer and a refractive structure layer. The light source emits the light beam. By changing the relative positions between the light source and the refractive structure layer, the angle of the light beam incident to the refractive structure layer is adjustable. The light beams at different angles are refracted by the refractive structure layer and guided to the corresponding pattern sections. Consequently, different images can be displayed on the image display layer.

The other objects and advantages of the present invention will be understood from the disclosed technical features.

In accordance with an aspect of the present invention, an image display device for an electronic device. The image display device includes a light source, an image display layer and a refractive structure layer. The light source emits a light beam. The image display layer is located over the light source. The image display layer includes plural pattern sections. The refractive structure layer is arranged between the light source and the image display layer. The light beam is refracted by the refractive structure layer and guided to the image display layer. The refractive structure layer has an optical axis and a reference plane. The reference plane is perpendicular to the optical axis. When the image display device is in a first usage state and the light beam is irradiated on the refractive structure layer, there is a first angle between the light beam and the reference plane, and the light beam is guided to a first pattern section of the plural pattern sections, so that a first image is displayed on the image display layer. When the image display device is in a second usage state and the light beam is irradiated on the refractive structure layer, there is a second angle between the light beam and the reference plane, and the light beam is guided to a second pattern section of the plural pattern sections, so that a second image is displayed on the image display layer. The first angle and the second angle are different.

In an embodiment, the refractive structure layer includes plural microlens structures, and the microlens structures have respective curved surfaces that are convex toward the light source. A convex direction of the plural curved surfaces is in parallel with the optical axis and perpendicular to the reference plane.

In an embodiment, there is a distance X between the light source and the image display layer, and a long side of each pattern section has a length Y, wherein $X \geq 1/3Y$.

In an embodiment, the electronic device includes a casing member, and the image display device is disposed within the casing member. The casing member includes a first casing part and a second casing part. The image display layer is located near the first casing part. The first casing part is made of a translucent material. The first image or the second image is displayed on the first casing part.

When the image display device is in the first usage state, the light source is located at a first position relative to the refractive structure layer. When the image display device is in the second usage state, the light source is located at a second position relative to the refractive structure layer, wherein the first position is different from the second position.

In an embodiment, the electronic device includes an input device and a processing control unit, and the processing control unit is electrically connected with the input device and the light source. While the first usage state is switched to the second usage state, the input device generates a first input signal in response to a user's operation, and the processing control unit controls movement of the light source from the first position to the second position according to the first input signal. While the second usage state is switched to the first usage state, the input device generates a second input signal in response to the user's operation, and the processing control unit controls movement of the light source from the second position to the first position according to the second input signal.

In an embodiment, the input device includes a touch panel or a key switch.

In an embodiment, the image display layer is made of polyethylene terephthalate, acrylonitrile butadiene styrene or transparent glass material.

In an embodiment, the image display layer and the refractive structure layer are integrally formed as a one-piece structure.

In accordance with another aspect of the present invention, an image display device for an electronic device. The image display device includes a first light source, a second light source, an image display layer and a refractive structure layer. The first light source emits a first light beam. The second light source emits a second light beam. The image display layer is located over the first light source and the second light source. The image display layer includes plural pattern sections. The refractive structure layer is arranged between the first light source, the second light source and the image display layer. The first light beam or the second light beam is refracted by the refractive structure layer and guided to the image display layer. The refractive structure layer has an optical axis and a reference plane. The reference plane is perpendicular to the optical axis. When the image display device is in a first usage state and the first light beam is irradiated on the refractive structure layer, there is a first angle between the first light beam and the reference plane, and the first light beam is guided to a first pattern section of the plural pattern sections, so that a first image is displayed on the image display layer. When the image display device is in a second usage state and the second light beam is irradiated on the refractive structure layer, there is a second angle between the second light beam and the reference plane and the second light beam is guided to a second pattern section of the plural pattern sections, so that a second image is displayed on the image display layer. The first angle and the second angle are different.

In an embodiment, the first light source is located at a first position relative to the refractive structure layer, and the second light source is located at a second position relative to the refractive structure layer. The first position is different from the second position.

In an embodiment, the electronic device includes an input device and a processing control unit, and the processing control unit is electrically connected with the input device, the first light source and the second light source. While the first usage state is switched to the second usage state, the input device generates a first input signal in response to a user's operation, and the processing control unit disables the first light source and enables the second light source according to the first input signal. While the second usage state is switched to the first usage state, the input device generates a second input signal in response to the user's operation, and the processing control unit disables the second light source and enables the first light source according to the second input signal.

From the above descriptions, the present invention provides the image display device. The light source emits the light beam. By changing the relative positions between the light source and the refractive structure layer, the angle of the light beam incident to the refractive structure layer (i.e., the angle between the light beam and the reference plane) is adjustable. In other words, light beams at different angles are refracted by the refractive structure layer and guided to the corresponding pattern sections. Consequently, different images can be displayed on the image display layer. When the image display device of the present invention is applied to the electronic device such as a mouse, a keyboard, a notebook computer or a smart phone, different images can be displayed on the same position of the electronic device through the image display device. In addition, the change of different images at the same viewing angle can be observed. Moreover, the relative positions between the light source and the refractive structure layer can be controlled through the input device (e.g., the touch panel or the key switch) of the electronic device. Consequently, different images can be displayed.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
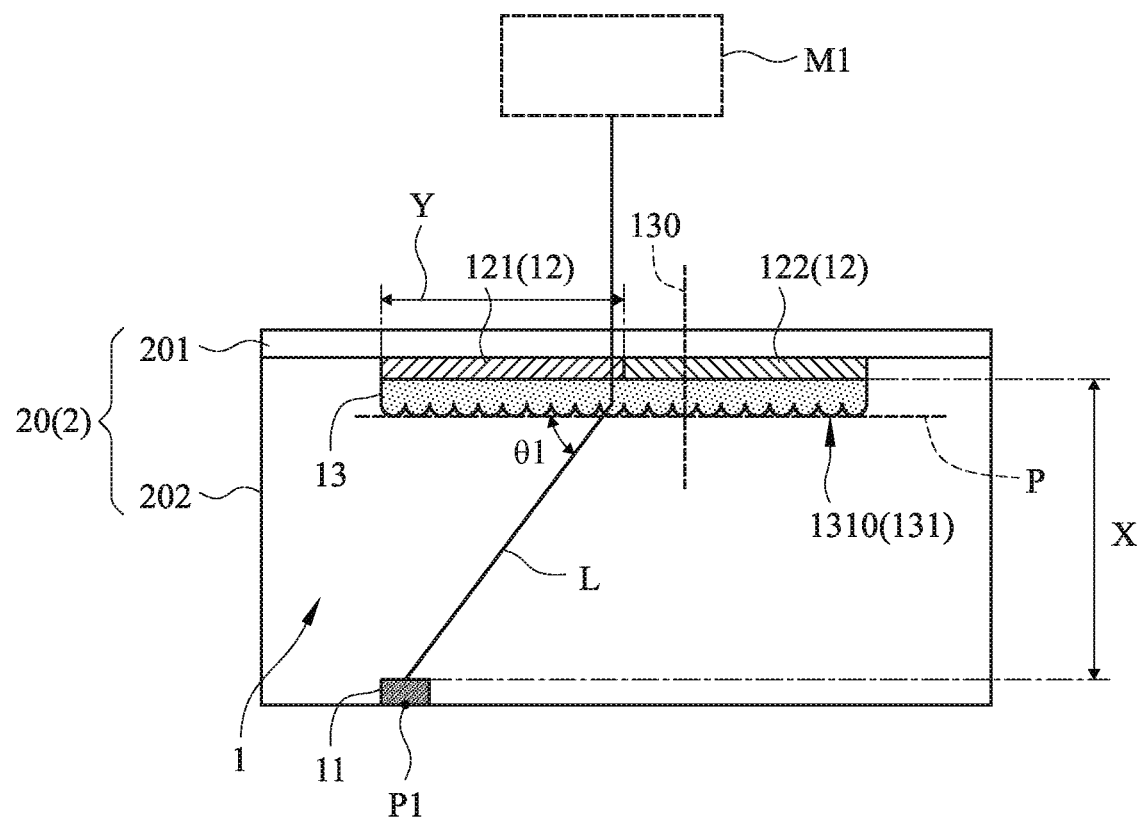
FIG. 1 schematically illustrates an image display device according to a first embodiment of the present invention, in which the image display device is in a first usage state.
Figure 2:
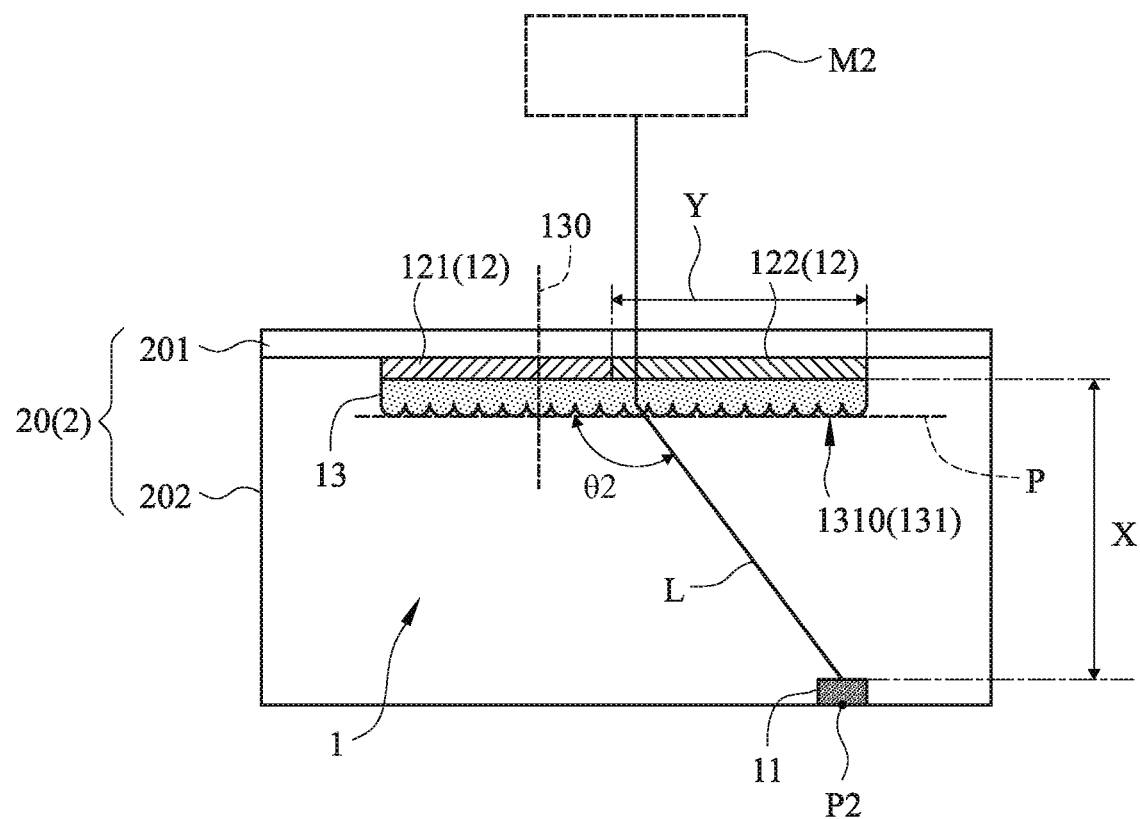
FIG. 2 schematically illustrates the image display device of FIG. 1 in a second usage state.

Please refer to FIGS. 1 and 2. FIG. 1 schematically illustrates an image display device according to a first embodiment of the present invention, in which the image display device is in a first usage state. FIG. 2 schematically illustrates the image display device of FIG. 1 in a second usage state. The image display device 1 is applied to an electronic device 2. For example, the electronic device 2 is a mouse device, a keyboard device, a notebook computer or a smart phone. It is noted that the type of the electronic device using the image display device 1 is not restricted. In an embodiment, the image display device 1 comprises a light source 11, an image display layer 12 and a refractive structure layer 13. The light source 11 emits a light beam L. The image display layer 12 is located over the light source 11. The image display layer 12 comprises plural pattern sections. For succinctness, the image display layer 12 comprises two pattern sections, i.e., a first pattern section 121 and a second pattern section 122. It is noted that the number of the pattern sections is not restricted. As long as the image display layer comprises at least two pattern sections, the number of the pattern sections may be varied according to the practical requirements. The refractive structure layer 13 is arranged between the light source 11 and the image display layer 12. The light source 11 emits a light beam L. The light beam L is refracted by the refractive structure layer 13. Consequently, the light beam L is guided to the image display layer 12. Moreover, the refractive structure layer 13 has an optical axis 130 and a reference plane P. The reference plane P is perpendicular to the optical axis 130.

As shown in FIGS. 1 and 2, the refractive structure layer 13 comprises plural microlens structures 131 in an array arrangement. Each microlens structure 131 has a curved surface 1310 that is convex toward the light source 11. These curved surfaces 1310 face the light source 11. Moreover, the light beam L from the light source 11 is received and refracted by theses curved surfaces 1310. In an embodiment, the convex direction of these curved surfaces 1310 is in parallel with the optical axis 130 and perpendicular to the reference plane P.

Preferably but not exclusively, the refractive structure layer 13 is a grating sheet. In an embodiment, the image display layer 12 and the refractive structure layer 13 are individual components. A process of fabricating the image display layer 12 will be described as follows. Firstly, plural images to be displayed are processed as a special image by a computer. Then, the special image is printed on a substrate, and thus an image display layer 12 with plural pattern sections is formed. Then, the image display layer 12 and the refractive structure layer 13 are precisely attached on each other. In another embodiment, the image display layer 12 and the refractive structure layer 13 are integrally formed as a one-piece structure. That is, after the plural images to be displayed are processed as a special image by a computer, the special image is directly printed on the surface of the refractive structure layer 13 without the microlens structures 131. Consequently, plural pattern sections are formed on the refractive structure layer 13. For example, the image display layer 12 is made of polyethylene terephthalate, acrylonitrile butadiene styrene, transparent glass or any other appropriate light-transmissible material. It is noted that the material of the image display layer 12 is not restricted.

The operations of the image display device in different usage states will be described as follows.

As shown in FIG. 1, the image display device 1 is operated in a first usage state. The light source 11 is located at a first position P1 relative to the refractive structure layer 13. When the light source 11 at the first position P1 emits the light beam L to the refractive structure layer 13, there is a first angle θ1 between the light beam L and the reference plane P. The light beam L is refracted by the refractive structure layer 13 and guided to the first pattern section 121 of the image display layer 12. Consequently, a first image M1 corresponding to the first pattern section 121 is displayed on the image display layer 12.

As shown in FIG. 2, the image display device 1 is operated in a second usage state. The light source 11 is moved from the first position P1 to a second position P2. When the light source 11 at the second position P2 emits the light beam L to the refractive structure layer 13, there is a second angle θ2 between the light beam L and the reference plane P. The light beam L is refracted by the refractive structure layer 13 and guided to the second pattern section 122 of the image display layer 12. Consequently, a second image M2 corresponding to the second pattern section 122 is displayed on the image display layer 12. The first angle θ1 and the second angle θ2 are different.

After the position of the light source 11 relative to the refractive structure layer 13 is changed and the light beam L 11 is irradiated on the refractive structure layer 13, the angle between the light beam L and the reference plane P is correspondingly changed. The light beams L at different angles are refracted and guided to the corresponding pattern sections. Consequently, different images can be displayed on the image display layer 12. The number of the displayed images is determined according to the number of the pattern sections of the image display layer 12.

In this embodiment, the movement of the light source 11 between the first position P1 and the second position P2 indicates that the light source 11 is moved relative to the refractive structure layer 13 in the leftward direction or the rightward direction. Alternatively, the movement of the light source 11 between the first position P1 and the second position P2 indicates that the light source 11 is moved relative to the refractive structure layer 13 in a forward direction, a backward direction, an upward direction or a downward direction. Regardless of whether the light source 11 is moved to a different position in the forward direction, the backward direction, the leftward direction, the rightward direction, the upward direction or the downward direction, the angle between the light beam L and the reference plane P is changed after the light beam L is irradiated on the refractive structure layer 13. Consequently, a different image is displayed on the image display layer 12.

As shown in FIGS. 1 and 2, the electronic device 2 comprises a casing member 20, and the image display device 1 is disposed within the casing member 20. The casing member 20 of the electronic device 2 comprises a first casing part 201 and a second casing part 202. The image display layer 12 of the image display device 1 is located near the first casing part 201 of the electronic device 2. In this embodiment, the image display layer 12 is attached on the first casing part 201 of the electronic device 2. For example, the first casing part 201 of the electronic device 2 is made of a translucent material. Consequently, the first image M1 or the second image M2 can be further displayed on the first casing part 201.

In practice, the first image M1 and the second image M2 are displayed on the image display layer 12 and the first casing part 201 of the electronic device 2. For succinctness, the first image M1 and the second image M2 as shown in FIGS. 1 and 2 are displayed over the image display device 1 and the electronic device 2.

Figure 3:
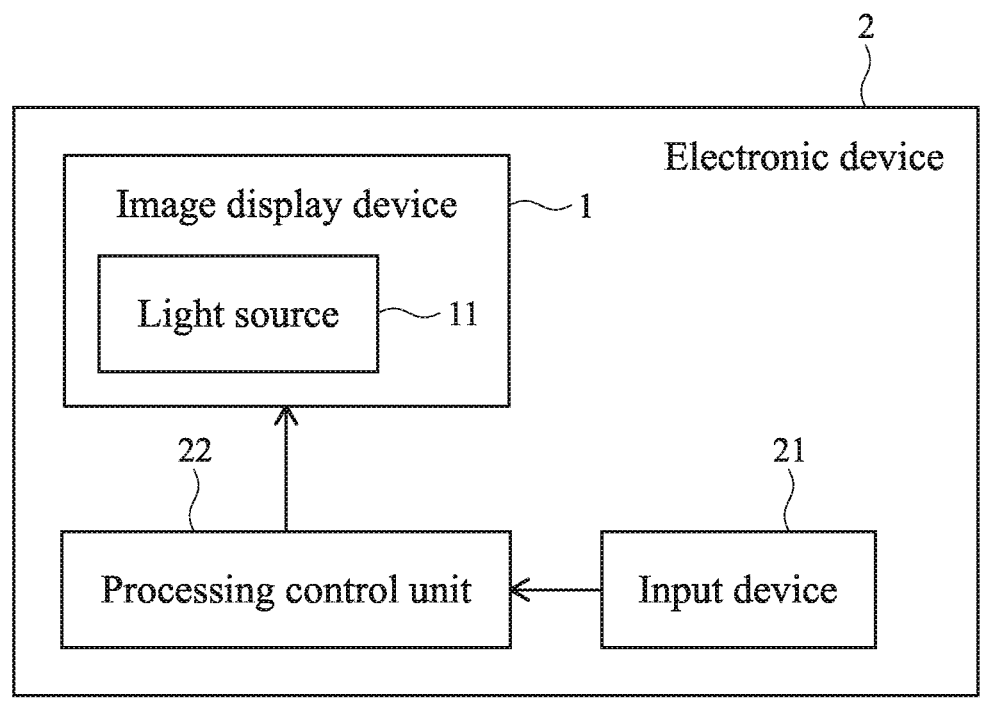
FIG. 3 is a schematic functional block diagram illustrating the mechanism of the electronic device as shown in FIGS. 1 and 2 for controlling the light source of the image display device.

FIG. 3 is a schematic functional block diagram illustrating the mechanism of the electronic device as shown in FIGS. 1 and 2 for controlling the light source of the image display device. Please refer to FIGS. 1, 2 and 3. In this embodiment, the electronic device 2 comprises an input device 21 and a processing control unit 22. The processing control unit 22 is electrically connected with the input device 21 and the light source 11 of the image display device 1. While the first usage state is switched to the second usage state, the input device 21 generates a first input signal in response to the user's operation. Moreover, according to the first input signal, the processing control unit 22 controls the movement of the light source 11 from the first position P1 to the second position P2. Consequently, when the light beam L is irradiated on the refractive structure layer 13, the angle between the light beam L and the reference plane P is changed from the first angle θ1 to the second angle θ2. While the second usage state is switched to the first usage state, the input device 21 generates a second input signal in response to the user's operation. Moreover, according to the second input signal, the processing control unit 22 controls the movement of the light source 11 from the second position P2 to the first position P1. Consequently, when the light beam L is irradiated on the refractive structure layer 13, the angle between the light beam L and the reference plane P is changed from the second angle θ2 to the first angle θ1.

In an example of switching between the first image M1 and the second image M2, the text is switched to the picture, or the text is switched to a continuous action image composed of plural pictures. Take an input device for example. The trademark totem of the manufacturer may be switched between a static image and a dynamic image. For example, the dynamic image may generate a special effect similar to the running special effect of the little green man at the traffic light. For example, the marks on the keys may be switched from the original texts W, A, S, D to the pictures ↑, ←, ↓, →. Preferably but not exclusively, the input device 21 of the electronic device 2 is a touch panel or a key switch.

As mentioned above, the movement of the light source 11 of the image display device 1 can be controlled through the electronic device 2. Moreover, the brightness and the color of the light beam L from the light source 11 may be controlled through the electronic device 2. Consequently, the brightness or color of the image is changed, the display image is dynamically changed, or various optical effects are generated. Moreover, the on/off states of the light source 11 may be controlled through the electronic device 2.

Please refer to FIGS. 1 and 2 again. There is a distance X between the light source 11 of the image display device 1 and the image display layer 12. Moreover, the long side of each pattern section (e.g., the first pattern section 121 or the second pattern section 122) has a length Y. The relationship between the distance X and the length Y may be expressed as: $X \geq 1/3Y$. If the light source 11 is close to the image display layer 12 (e.g., $X < 1/3Y$), the image is still displayed on the image display layer 12 when the light beam is irradiated on the refractive structure layer 13. However, since the pattern section is not covered by the illuminated range of the light source 11, the portion of the pattern section that is illuminated by the light source 11 is too bright, and the portion of the pattern section that is not illuminated by the light source 11 is too dark. In other words, the brightness of the image is not uniform.

Figure 4:
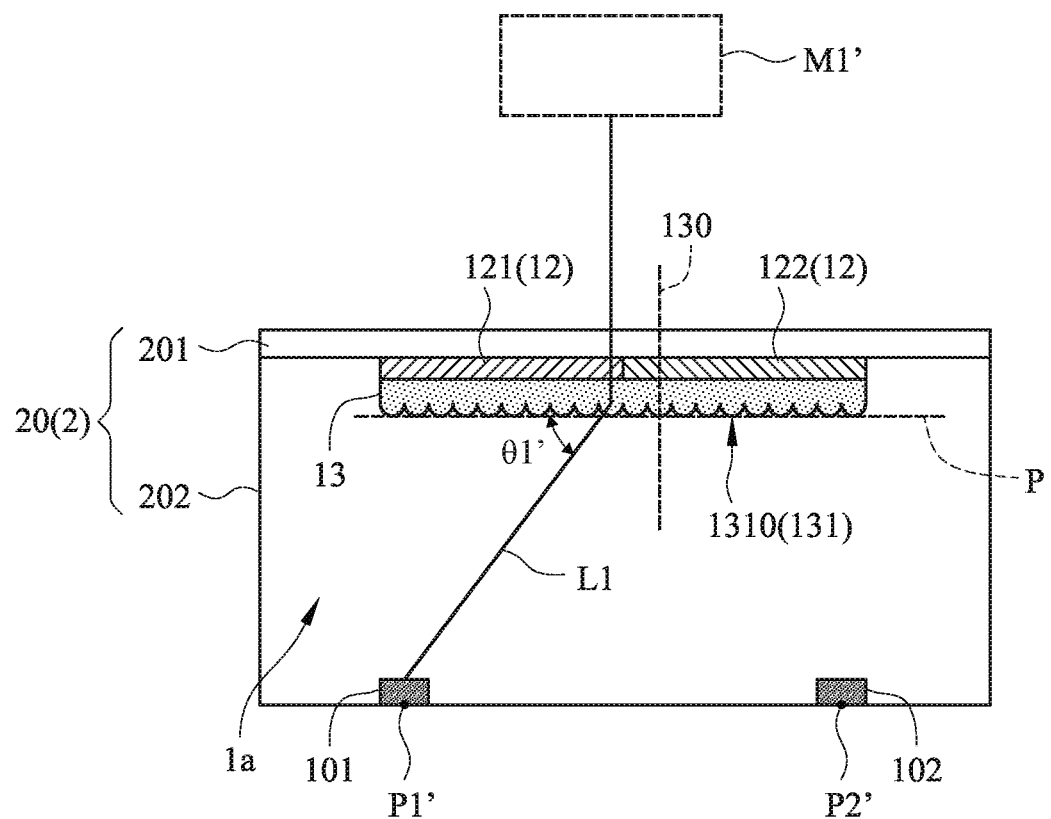
FIG. 4 schematically illustrates an image display device according to a second embodiment of the present invention, in which the image display device is in a first usage state.
Figure 5:
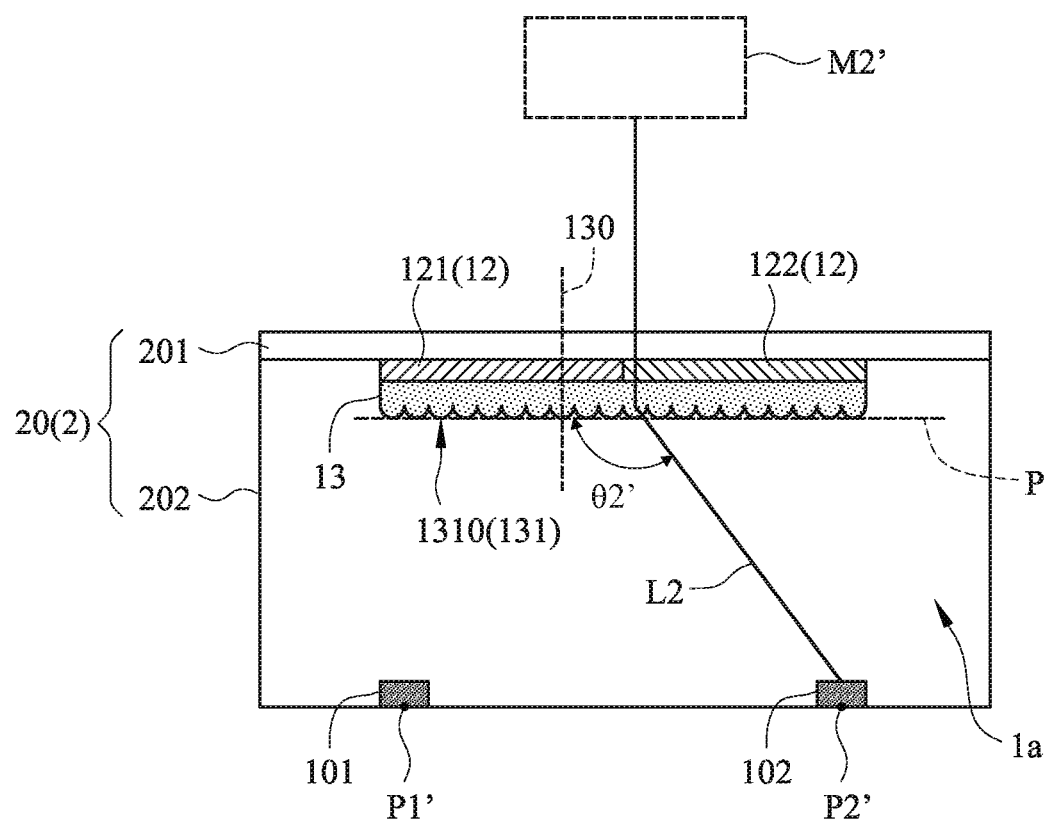
FIG. 5 schematically illustrates the image display device of FIG. 4 in a second usage state.

Please refer to FIGS. 4 and 5. FIG. 4 schematically illustrates an image display device according to a second embodiment of the present invention, in which the image display device is in a first usage state. FIG. 5 schematically illustrates the image display device of FIG. 4 in a second usage state. The structure of the image display device 1a of this embodiment is similar to that of the image display device 1 as shown in FIGS. 1 and 2. The image display device 1a is applied to an electronic device 2. For example, the electronic device 2 is a mouse device, a keyboard device, a notebook computer or a smart phone. In comparison with the first embodiment, the image display device 1a comprises a first light source 101 and a second light source 102. The first light source 101 emits a first light beam L1. The second light source 102 emits a second light beam L2. The first light source 101 and the second light source 102 are located at the same horizontal plane. It is noted that the relative positions between the first light source 101 and the second light source 102 are not restricted. The image display layer 12 is located over the first light source 101 and the second light source 102. The refractive structure layer 13 is arranged between the first light source 101, the second light source 102 and the image display layer 12. The first light source 101 is located at a first position P1' relative to the refractive structure layer 13. The second light source 102 is located at a second position P2' relative to the refractive structure layer 13. The structures of other components of the image display device 1a are similar to those of the first embodiment, and not redundantly described herein.

As shown in FIG. 4, the image display device 1a is operated in a first usage state. When the first light source 101 at the first position P1' emits the first light beam L1 to the refractive structure layer 13, there is a first angle θ1' between the first light beam L1 and the reference plane P. The first light beam L1 is refracted by the refractive structure layer 13 and guided to the first pattern section 121 of the image display layer 12. Consequently, a first image M1' corresponding to the first pattern section 121 is displayed on the image display layer 12.

As shown in FIG. 5, the image display device 1a is operated in a second usage state. When the second light source 102 at the second position P2' emits the second light beam L2 to the refractive structure layer 13, there is a second angle θ2' between the second light beam L2 and the reference plane P. The second light beam L2 is refracted by the refractive structure layer 13 and guided to the second pattern section 122 of the image display layer 12. Consequently, a second image M2' corresponding to the second pattern section 122 is displayed on the image display layer 12. The first angle θ1' and the second angle θ2' are different.

In this embodiment, the first light source 101 and the second light source 102 are fixedly located at the first position P1' and the second position P2', respectively. Alternatively, the first light source 101 and the second light source 102 are movable relative to the refractive structure layer 13 in a forward direction, a backward direction, a leftward direction, a rightward direction, an upward direction or a downward direction.

Figure 6:
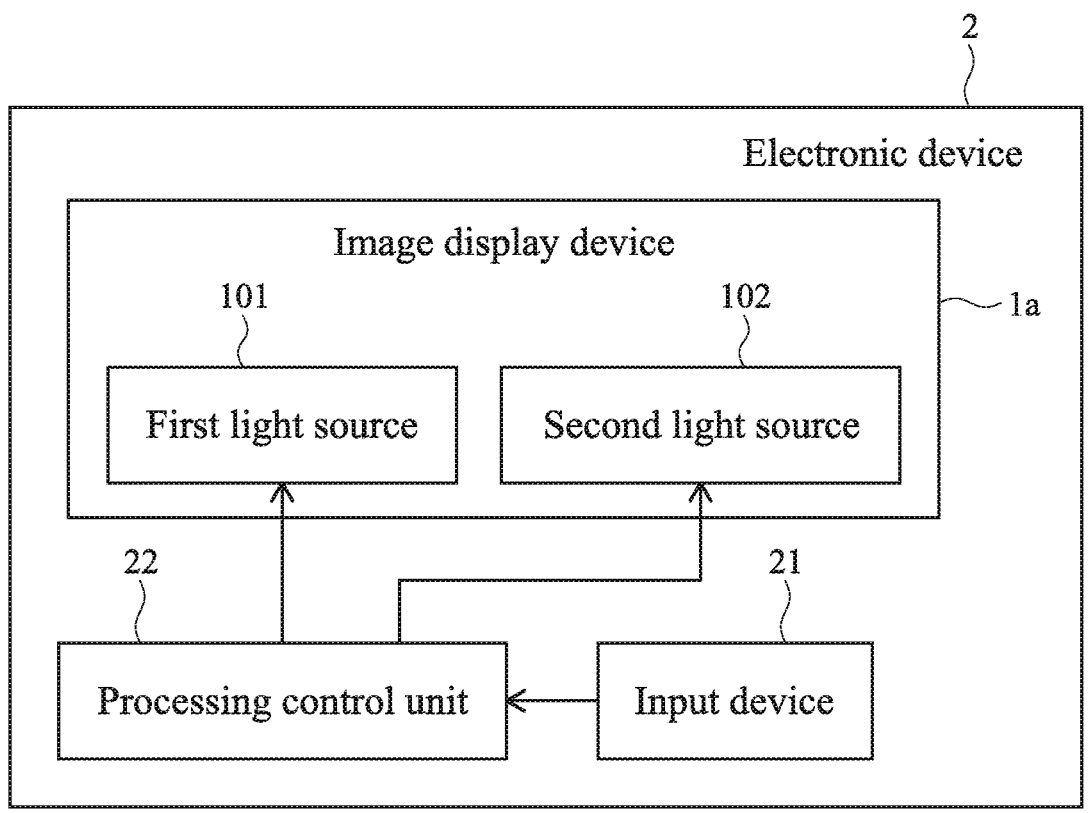
FIG. 6 is a schematic functional block diagram illustrating the mechanism of the electronic device as shown in FIGS. 4 and 5 for controlling the first light source and the second light source of the image display device.

FIG. 6 is a schematic functional block diagram illustrating the mechanism of the electronic device as shown in FIGS. 4 and 5 for controlling the first light source and the second light source of the image display device. Please refer to FIGS. 4, 5 and 6. In this embodiment, the electronic device 2 comprises an input device 21 and a processing control unit 22. The processing control unit 22 is electrically connected with the input device 21 and the first light source 101 and the second light source 102 of the image display device 1a. While the first usage state is switched to the second usage state, the input device 21 generates a first input signal in response to the user's operation. Moreover, according to the first input signal, the processing control unit 22 disables the first light source 101 and enables the second light source 102. Consequently, when the second light beam L2 from the second light source 102 is irradiated on the refractive structure layer 13, the angle between the second light beam L2 and the reference plane P is the second angle θ2'. While the second usage state is switched to the first usage state, the input device 21 generates a second input signal in response to the user's operation. Moreover, according to the second input signal, the processing control unit 22 disables the second light source 102 and enables the first light source 101. Consequently, when the first light beam L1 is irradiated on the refractive structure layer 13, the angle between the first light beam L1 and the reference plane P is the first angle θ1'.

In this embodiment, the image display device comprises two light sources. It is noted that the number of the light sources is not restricted. As long as the image display layer comprises at least two light sources, the number of the light sources may be varied according to the practical requirements. For example, in another embodiment, the image display layer comprises a first light source 101, the second light source 102 and a third light source. The third light source is located at a third position. The third position is different from the positions of the first light source 101 and the second light source 102. Since the image display device comprises three light sources, the image display layer comprises three pattern sections. That is, the image display device comprises a first pattern section 121, a second pattern section 122 and a third pattern section. When the third light source at the third position emits a third light beam to the refractive structure layer 13, there is a third angle between the second light beam L2 and the reference plane P. The third angle is different from the first angle θ1' and the second angle θ2' as shown in FIGS. 4 and 5. The third light beam is refracted by the refractive structure layer 13 and guided to the third pattern section of the image display layer. Consequently, a third image corresponding to the third pattern section is displayed on the image display layer.

In case that the image display device comprises plural light sources and one of these light sources is movable, the number of the pattern sections of the image display layer and the number of the light sources may be different. For example, the number of the pattern sections of the image display layer is larger than the number of the light sources.

From the above descriptions, the present invention provides the image display device. The light source emits the light beam. By changing the relative positions between the light source and the refractive structure layer, the angle of the light beam incident to the refractive structure layer (i.e., the angle between the light beam and the reference plane) is adjustable. In other words, light beams at different angles are refracted by the refractive structure layer and guided to the corresponding pattern sections. Consequently, different images can be displayed on the image display layer. When the image display device of the present invention is applied to the electronic device such as a mouse, a keyboard, a notebook computer or a smart phone, different images can be displayed on the same position of the electronic device through the image display device. In addition, the change of different images at the same viewing angle can be observed. Moreover, the relative positions between the light source and the refractive structure layer can be controlled through the input device (e.g., the touch panel or the key switch) of the electronic device. Consequently, different images can be displayed.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An image display device for an electronic device, the image display device comprising:
    a light source emitting a light beam;
    an image display layer located over the light source, wherein the image display layer comprises plural pattern sections; and
    a refractive structure layer arranged between the light source and the image display layer, wherein the light beam is refracted by the refractive structure layer and guided to the image display layer, wherein the refractive structure layer has an optical axis and a reference plane, and the reference plane is perpendicular to the optical axis,
    wherein when the image display device is in a first usage state and the light beam is irradiated on the refractive structure layer, there is a first angle between the light beam and the reference plane, and the light beam is guided to a first pattern section of the plural pattern sections, so that a first image is displayed on the image display layer, wherein when the image display device is in a second usage state and the light beam is irradiated on the refractive structure layer, there is a second angle between the light beam and the reference plane, and the light beam is guided to a second pattern section of the plural pattern sections, so that a second image is displayed on the image display layer, wherein the first angle and the second angle are different,
    wherein there is a distance X between the light source and the image display layer, and a long side of each pattern section has a length Y, wherein $X \geq 1/3Y$.

2. The image display device according to claim 1, wherein the refractive structure layer comprises plural microlens structures, and the microlens structures have respective curved surfaces that are convex toward the light source, wherein a convex direction of the plural curved surfaces is in parallel with the optical axis and perpendicular to the reference plane.

3. The image display device according to claim 1, wherein the electronic device comprises a casing member, and the image display device is disposed within the casing member, wherein the casing member comprises a first casing part and a second casing part, the image display layer is located near the first casing part, the first casing part is made of a translucent material, and the first image or the second image is displayed on the first casing part.

4. The image display device according to claim 1, wherein when the image display device is in the first usage state, the light source is located at a first position relative to the refractive structure layer, wherein when the image display device is in the second usage state, the light source is located at a second position relative to the refractive structure layer, wherein the first position is different from the second position.

5. The image display device according to claim 4, wherein the electronic device comprises an input device and a processing control unit, and the processing control unit is electrically connected with the input device and the light source, wherein while the first usage state is switched to the second usage state, the input device generates a first input signal in response to a user's operation, and the processing control unit controls movement of the light source from the first position to the second position according to the first input signal, wherein while the second usage state is switched to the first usage state, the input device generates a second input signal in response to the user's operation, and the processing control unit controls movement of the light source from the second position to the first position according to the second input signal.

6. The image display device according to claim 5, wherein the input device includes a touch panel or a key switch.

7. The image display device according to claim 1, wherein the image display layer is made of polyethylene terephthalate, acrylonitrile butadiene styrene or transparent glass material.

8. The image display device according to claim 1, wherein the image display layer and the refractive structure layer are integrally formed as a one-piece structure.

9. An image display device for an electronic device, the image display device comprising:
    a first light source emitting a first light beam;
    a second light source emitting a second light beam;
    an image display layer located over the first light source and the second light source, wherein the image display layer comprises plural pattern sections; and
    a refractive structure layer arranged between the first light source, the second light source and the image display layer, wherein the first light beam or the second light beam is refracted by the refractive structure layer and guided to the image display layer, wherein the refractive structure layer has an optical axis and a reference plane, and the reference plane is perpendicular to the optical axis,
    wherein when the image display device is in a first usage state and the first light beam is irradiated on the refractive structure layer, there is a first angle between the first light beam and the reference plane, and the first light beam is guided to a first pattern section of the plural pattern sections, so that a first image is displayed on the image display layer, wherein when the image display device is in a second usage state and the second light beam is irradiated on the refractive structure layer, there is a second angle between the second light beam and the reference plane and the second light beam is guided to a second pattern section of the plural pattern sections, so that a second image is displayed on the image display layer, wherein the first angle and the second angle are different, wherein there is a distance X between the light source and the image display layer, and a long side of each pattern section has a length Y, wherein $X \geq 1/3 Y$.

10. The image display device according to claim 9, wherein the first light source is located at a first position relative to the refractive structure layer, and the second light source is located at a second position relative to the refractive structure layer, wherein the first position is different from the second position.

11. The image display device according to claim 9, wherein the electronic device comprises an input device and a processing control unit, and the processing control unit is electrically connected with the input device, the first light source and the second light source, wherein while the first usage state is switched to the second usage state, the input device generates a first input signal in response to a user's operation, and the processing control unit disables the first light source and enables the second light source according to the first input signal, wherein while the second usage state is switched to the first usage state, the input device generates a second input signal in response to the user's operation, and the processing control unit disables the second light source and enables the first light source according to the second input signal.

* * * * *